United States Patent [19]
Fratiello et al.

[11] Patent Number: 5,155,330
[45] Date of Patent: Oct. 13, 1992

[54] METHOD AND APPARATUS FOR GMAW WELDING

[75] Inventors: Paul J. Fratiello, Willoughby Hills; Dennis K. Hartman, Olmsted Township, Cuyahoga County; Lee E. Seufer, Cleveland, all of Ohio

[73] Assignee: The Lincoln Electric Company, Cleveland, Ohio

[21] Appl. No.: 739,900

[22] Filed: Aug. 2, 1991

[51] Int. Cl.$^5$ .............................................. B23K 9/173
[52] U.S. Cl. .................. 219/137 R; 219/74; 219/137.2
[58] Field of Search ............... 219/74, 137.2, 137 R

[56] References Cited

U.S. PATENT DOCUMENTS

| | | | |
|---|---|---|---|
| 2,868,956 | 1/1959 | Lobosco | 219/137 R |
| 3,007,033 | 10/1961 | Newman et al. | 219/74 |
| 3,062,950 | 11/1962 | Chyle | 219/127 |
| 3,278,720 | 10/1966 | Dixon | 219/74 |
| 3,751,628 | 8/1973 | Scherl | 219/137 R |
| 4,058,700 | 11/1977 | Ito et al. | 219/137 R |

FOREIGN PATENT DOCUMENTS 898151  6/1962  United Kingdom ............... 219/74

Primary Examiner—Clifford C. Shaw
Attorney, Agent, or Firm—Body, Vickers & Daniels

[57] ABSTRACT

A method and apparatus of welding along a pass line on a steel workpiece, which method and apparatus comprises simultaneously feeding two welding wires in generally parallel relationship toward a workpiece with extended welding wires generally intersecting the workpiece at individual points spaced from each other a distance in the range about 3/16 inch to about ⅜ inch; then creating a separate arc between each of the wires and the workpiece; passing a single protective envelope of shielding gas axially along two welding wires simultaneously and around said two separate arcs extending between welding wires and the workpiece; and, causing relative movement between the two gas shielded welding wires and the workpiece in the direction corresponding to the desired pass line on the workpiece.

37 Claims, 5 Drawing Sheets

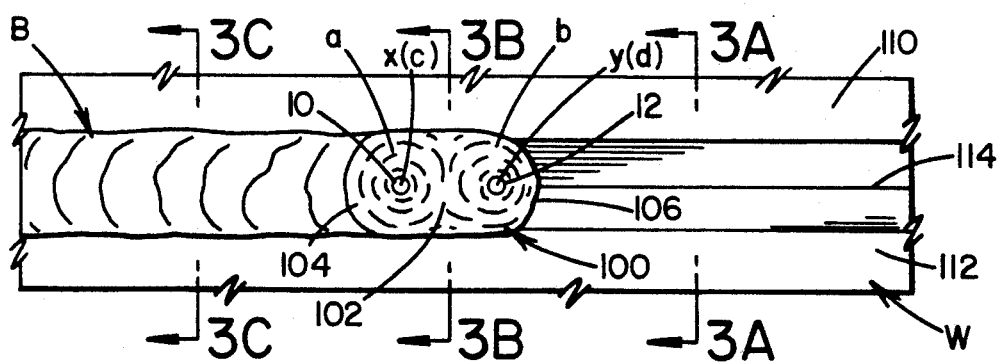
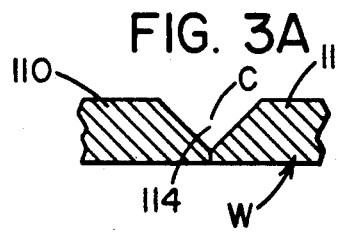 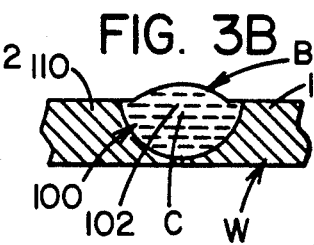 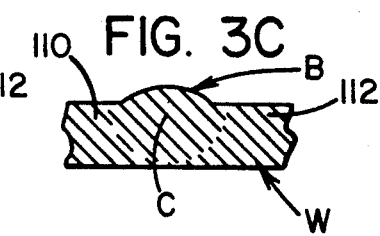
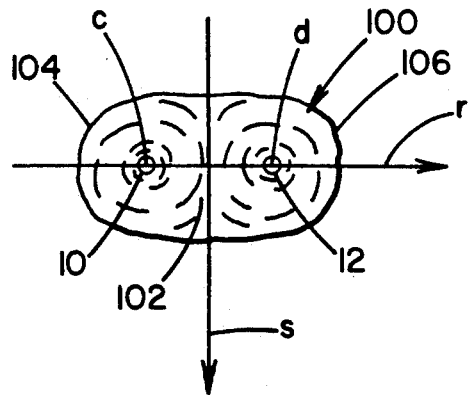 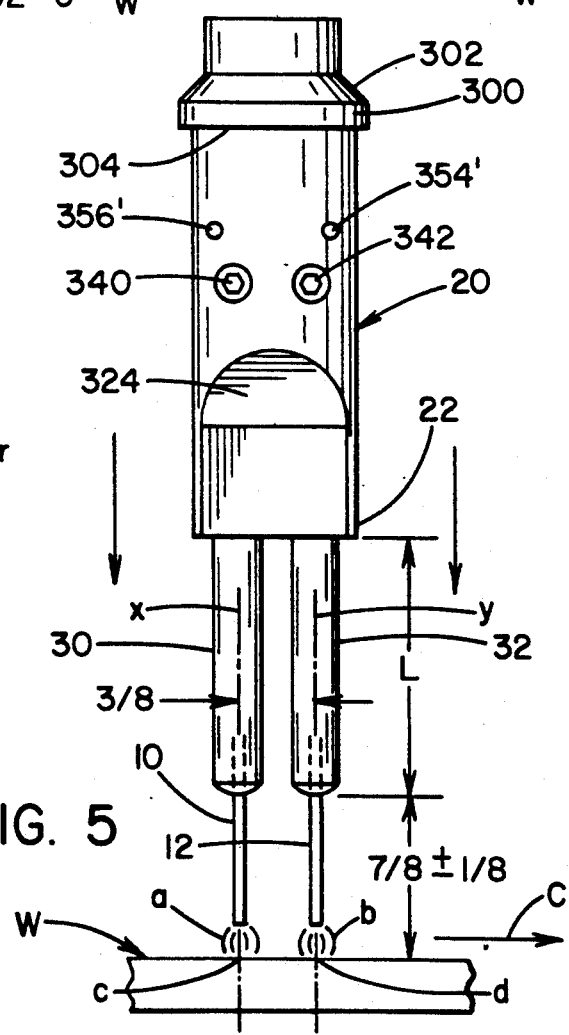

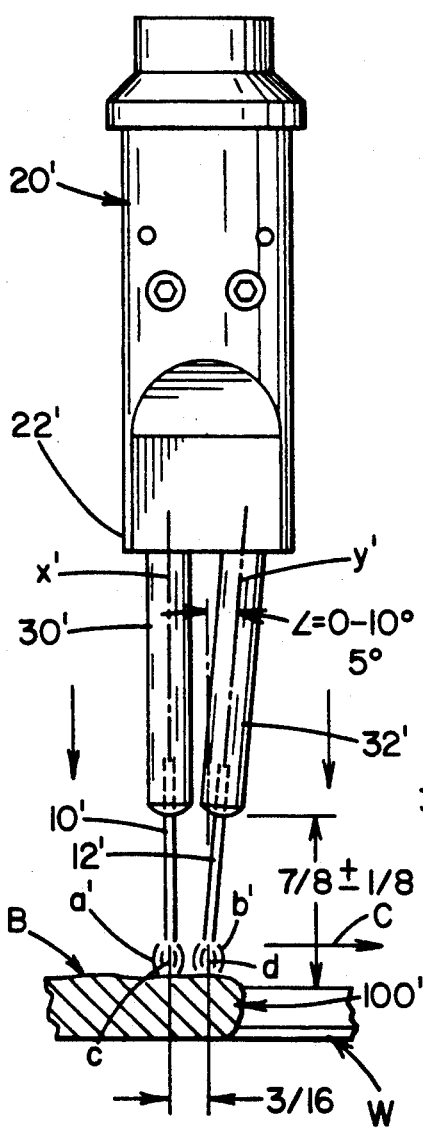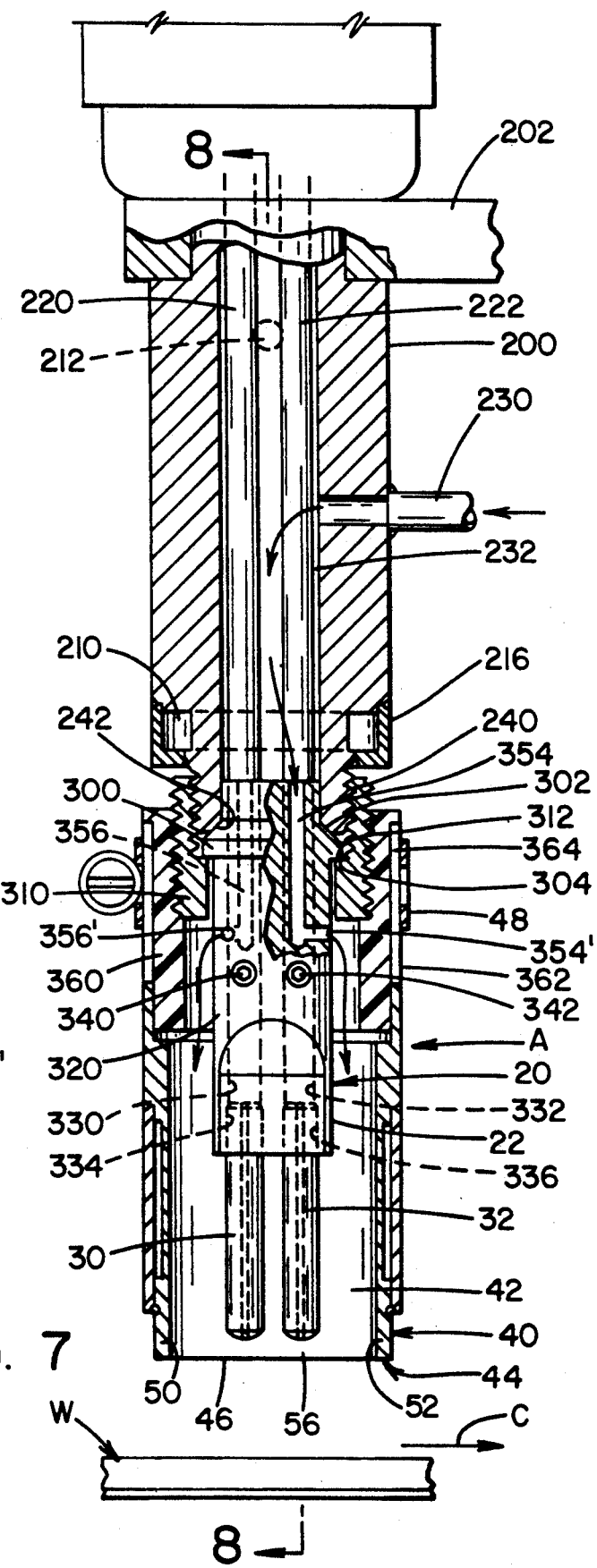

METHOD AND APPARATUS FOR GMAW WELDING

The present invention relates to the art of arc welding and more particularly to a method and apparatus for GMAW welding, i.e. MIG welding, which method and apparatus has an increased amount of deposited metal for an open arc process for the energy consumed and the time required in the process and while using the apparatus.

BACKGROUND OF INVENTION

Several methods of arc welding are employed to deposit weld metal along a weld pass line on a workpiece by creating an arc between a metal electrode and the workpiece, which arc melts the electrode and allows deposition of the electrode along the weld pass. An objective of welding procedures involves the rapid deposition of large amounts of weld metal onto the workpiece in a minimum time employing a minimum amount of electrical energy. In some situations it has been suggested that it is advisable to simultaneously melt and deposit metal from two separate consumable electrodes during a single welding operation. The use of two separate welding electrodes, instead of a large diameter wire or electrode, can result in a reduction of electrical energy as well as increased speed or deposition rate; however, there are limitations in employing a welding procedure using two electrodes instead of a single large consumable electrode. One of the difficulties is that separate power supplies are sometimes required to create the separate arcs between the two electrodes and the workpiece. When doing this, two separate mechanisms are needed to guide the welding wires or electrodes toward the workpiece. Consequently, extremely expensive mechanisms and equipment are required. To overcome this difficulty, certain welding processes have been developed to use a single power supply with two separate electrodes driven simultaneously toward the workpiece through a common electrically conductive contact element. The electrical energy is divided between the two electrodes or wires being driven toward the workpiece. When doing this, the two wires or electrodes have been incorporated in either a submerged arc electric welding process or a welding process using electrodes wit shielding gas creating constituents incorporated in the core of hollow, consumable electrodes. In each of these welding processes, the electrode or wire is relatively large and the wires are substantially spaced from each other. Thus, in both of these two arc welding processes there is a tendency for the molten metal pool of the two separate electrodes or welding wires to become separated with an intermediate solidified metal portion. This solidified metal will cause a certain amount of porosity in the resulting weld bead and will require more current to maintain the pool between the two simultaneously driven electrodes in a single molten pool or puddle. Due to the restraints of maintaining the molten condition of the puddle between the electrodes, as well as separate and distinct electric arcs between the two electrodes and the workpiece, the electrodes have heretofore been spaced apart a substantial distance usually greater than about ½ inch. In the submerged arc process the molten metal of the weld puddle must be covered with a granular fluxing agent which prevents exposure of the puddle to the open air which also helps in preventing the puddle form freezing. Consequently, relatively long spacing is used with a covering flux to maintain molten metal without intermediate freezing of the molten metal between the two electrodes or wires. Thus, submerged arc welding with one or two power supplies and employing two separate and distinct welding electrodes or welding wires is used in the welding industry, but this process requires a distinct cover for the molten metal. This submerged arc process which demands covering of the pool or puddle has the advantages of using two separate welding wires with two arcs. A single power supply can create both arcs. The concept of two separate welding wires with two arcs has been extended further into a welding process whereby two welding wires are driven simultaneously toward a workpiece with the wires each including a core with material for creating shielding gas so that each of the separate electrodes, as it is driven toward the workpiece, creates its own surrounding envelope of shielding gas. In this welding operation, the molten metal between the electrodes can be maintained in a molten condition due to the encompassing and insulating effect of the relatively hot gases surrounding both of the remotely positioned, generally parallel electrodes used in this welding process as well as the insulation provided by the slag layer on top of the puddle. Again, the two electrodes are relatively large to accommodate the material for generating the necessary shielding gases. Thus, the wires must be substantially spaced from each other. Further, large spacing must be used because of the relative arc size associated with the larger, higher current arcs. This spacing is also used so that the shielding gases around each electrode can perform its function in between the consumed wires. This spacing between the centerlines of the electrodes is over about ½ inch. Thus, the two prior welding processes for employing two separate electrodes with two electrical arcs at the weld puddles have both required relatively large wires, spaced a substantial distance from each other and employing a substance over the metal at the puddle between the electrodes to aid in preventing the puddle from sliding in this specially protected area. Consequently, the electrodes were large and were spaced apart. The weld puddle was covered with a flux or a shielding gas between the electrodes to help in preventing rapid freezing of the metal between the electrodes. These constraints which have been necessary for using two parallel electrodes are not conducive to welding with small diameter solid wire or flux cored wire as used in GMAW or MIG welding. Thus, two electrode welding has been limited to submerged arc welding and welding where the electrodes themselves generate the shielding gas. In the past, it appeared that the use of small diameter electrodes or welding wires, whether flux cored or not, as used in GMAW or MIG welding, could not be employed with two arcs because the small diameter electrodes or wires would be too close to create separate welding arcs or too far away to prevent immediate freezing of the weld pool. With the small wires a lesser amount of energy is available to keep the puddle in a molten condition.

THE INVENTION

The present invention is directed to a method and apparatus for GMAW welding which is modified to employ two separate and distinct parallel electrodes which moves toward the weld puddle during the welding operation. The novel method and apparatus uses a specific spacing between relatively small welding wires or electrodes at the workpiece itself and involves a novel procedure for controlling the molten metal puddle between the two generally parallel electrodes as they are fed simultaneously to accomplish a unitary GMAW welding operation, even though the wires are small. Control of the molten metal puddle in the area between the electrodes is facilitated by a specially shaped shielding gas curtain in an essentially oblong configuration containing at each end the two electrodes surrounded by and located within the oblong curtain of shielding gas. By using the features of the method and apparatus of the present invention, small diameter electrodes or welding wire can be used in tandem with a single power supply to create separate electric arcs between the two separate electrodes or welding wires and the weld puddle between the electrodes is maintained in a molten condition as the welding process progresses along the pass line of a workpiece. This invention employs relatively small welding wire and precise, close spacing of the wires at the weld pool with a surrounding oblong curtain of gas so that the advantages of using two separate and distinct welding electrodes or wires can be obtained in a MIG or GMAW arc welding process.

The present invention involves a process that uses two separate and distinct, relatively small electrodes or wires provided with welding current by a single power supply, which process produces a rapid deposition of metal into the molten metal puddle. The deposition puddle is oblong and moves along the weld pass line of the welding operation while using a relatively low amount of energy with respect to the amount and speed of the weld metal deposition during the welding process. In the novel process, the two electrodes are encompassed within an oblong curtain or flow mass of shielding gas such as carbon dioxide, argon or combinations thereof. There is a specific spacing between the electrodes to prevent solidification of the puddles between the electrodes as the process is continuing. The oblong puddle shape is controlled by the spacing of the electrodes or wire and by the surrounding and encompassing curtain of shielding gas, which gas curtain insulates the metal between the two electrodes sufficiently to prevent premature solidification. The novel combination of the small spacing and the surrounding curtain of shielding gas allows GMAW or MIG welding with two separate and distinct, simultaneously moved electrodes or welding wires. These wires or electrodes need not be large in diameter and may be cored or solid wire. When using solid wire in the invention, the method is modified to allow one wire to be angularly disposed with respect to the other wire. This angle produces a relatively close spacing at the weld pool. The critical close spacing at the weld pool prevents solidification between the two electrodes or welding wires during the welding process. When flux cored wires or electrodes are employed, the two electrodes or wires are generally parallel to each other all the way to the workpiece puddle itself. In this embodiment, the spacing is somewhat greater since the fluxing agents within the core of the electrodes or wires create a slag which forms between the two electrodes during the welding process. This slag produces more fluid welding metal and allows the electrode to burn through the slag to the molten metal below during the arc welding process. In this embodiment of the novel process, two separate electric arcs are quite distinctively formed. When solid metal wire is employed, the spacing between the wires is reduced to assure molten metal between the two arcs. In this instance, the arcs sometimes have two separate originations but combine into a single arc at the workpiece itself. This arc configuration is still considered a dual arc process for GMAW or MIG welding.

The present invention relates primarily to the method of using two separate electrodes in a GMAW welding process, which method is operative to prevent solidification of the metal in the puddle between the electrodes and maintains two separate current paths between the electrodes and the workpiece. In accordance with another aspect of the invention, an apparatus for performing this novel and unique welding process has been invented.

In accordance with the present invention there is provided a method of welding along a pass line on a steel workpiece, which method comprises the steps of providing first and second consumable steel welding wires each having a diameter equal to or less than about 5/16 inch and each having an axially extending centerline. The wires are simultaneously fed with their centerlines in generally parallel relationship toward the workpiece, with the extended centerlines of the welding wires generally intersecting the workpiece at individual points spaced from each other a distance in the range of about 3/16 inch to ⅜ inch. Separate arcs are created between each of the wires and the workpiece while a single protective envelope of shielding gas is passed axially along the first and second welding wires simultaneously and around the two separate arc extending between the consumable welding wires and the workpiece. Relative movement between the two gas shielded welding wires and the workpiece in a direction corresponding to the pass line on the workpiece progresses the welding procedure. By using this method, a large volume of welding metal can be deposited with a minimum amount of electrical energy and a minimum of required time. A flux cored wire or electrode or a solid wire or electrode can be employed in this process.

In accordance with another aspect of the present invention, the centerline of the electrodes or wires as they extend toward the workpiece, have an included angle of less than 10°, and preferably approximately 5°. This angle is employed primarily when using solid welding wire and allows the two wires to converge as they move toward the workpiece. The centerlines intersect the workpiece at two spaced points, which points are relatively close together, such as about 3/16 inch, to produce a dual arc welding process with an oblong weld puddle maintained in a molten condition between the solid wires. This intermediate molten condition is maintained by a surrounding oblong shielding gas curtain.

Further in accordance with the present invention, there is provided an electric arc welding apparatus using a consumable welding wire and comprises an interchangeable, elongated, electrically conductive welding wire guide member having a generally cylindrical body with an upper end with means for mounting the guide member and a lower wire exit end. The guide member includes first and second parallel welding wire passages spaced from each other a selected centerline distance in a given direction and extending from the upper end to the exit end of the guide member. Means are provided in the guide member for threadably receiving a first tubular welding wire tip intersecting the first welding wire passage and for threadably receiving a second tubular welding wire tip intersecting the second welding wire passage, whereby the first and second welding wires can be simultaneously fed through the parallel passages of the guide member and through the first and second tubular wire tips toward the workpiece. This interchangeable welding wire guide member further includes means for directing a shielding gas generally outwardly from the cylindrical body of the guide member into an annular oblong passage formed by an external tubular shroud around the cylindrical body of the welding wire guide member. This shroud defines a downwardly extending gas passage to create an oblong curtain around the spaced wires as they form an oblong molten metal puddle at the workpiece during the welding operation.

In yet a further aspect of the present invention, there is provided an interchangeable, elongated electrically conductive welding wire member, as defined above, which member can be used for either flux cored electrode wire or solid electrode wire fed in tandem in general parallel relationship through the guide member from the welding station toward the workpiece being welded.

The primary object of the present invention is the provision of an improved GMAW welding process, which improved process allows the use of two closely spaced, relatively small electrodes driven in unison toward the workpiece being welded. The process maintains a molten condition in the weld puddle in the area between the two electrodes while maintaining separate current paths through the two electrodes. These current paths generally form two separate arcs or two arcs joining into a common arc at the weld puddle.

Yet another object of the present invention is the provision of an interchangeable welding wire guide member, which guide member is constructed to perform the novel method of simultaneously moving two generally parallel electrodes toward the workpiece while an oblong curtain of gas surrounds both of the electrodes to maintain a molten metal puddle below the electrodes and between the electrodes.

Still a further object of the present invention is the provision of a method and apparatus for using two separate and distinct simultaneously fed electrodes in a GMAW welding process, which method can employ both a flux cored electrode or a solid wire electrode.

Yet a further object of the present invention is the provision of a GMAW welding method, which method deposits a substantial amount of metal along a pass line of the workpiece with a reduced amount of electrical energy consumed in melting and depositing metal from the electrode to the workpiece and a minimum amount of time to perform the weld.

These and other objects and advantages will become apparent from the following description taken together with the accompanying drawings in which:

BRIEF DESCRIPTION OF THE DRAWINGS

The following drawings are employed for the purpose of illustrating the preferred embodiment of the present invention:

FIG. 3 is an enlarged schematic view of an operating characteristic of the preferred embodiment as shown in FIG. 1;

FIG. 3A is a cross section taken generally along line 3A—3A of FIG. 3;

FIG. 3B is a cross sectional view take generally along line 3B—3B of FIG. 3;

FIG. 3C is a cross sectional view taken generally along line 3C—3C of FIG. 3;

FIG. 4 is a schematic view of a molten metal puddle created by using the present invention and illustrating that this puddle can be moved in various directions;

FIG. 5 is an enlarged, partial side elevational view of the wire exit end of the wire guide member used for welding with flux cored wires;

FIG. 6 is a view similar to FIG. 5 modified for welding with solid metal welding wires;

FIG. 7 is a side elevational view partially cross sectioned to illustrate the preferred embodiment of the present invention;

PREFERRED EMBODIMENT OF THE INVENTION

Figure 1:
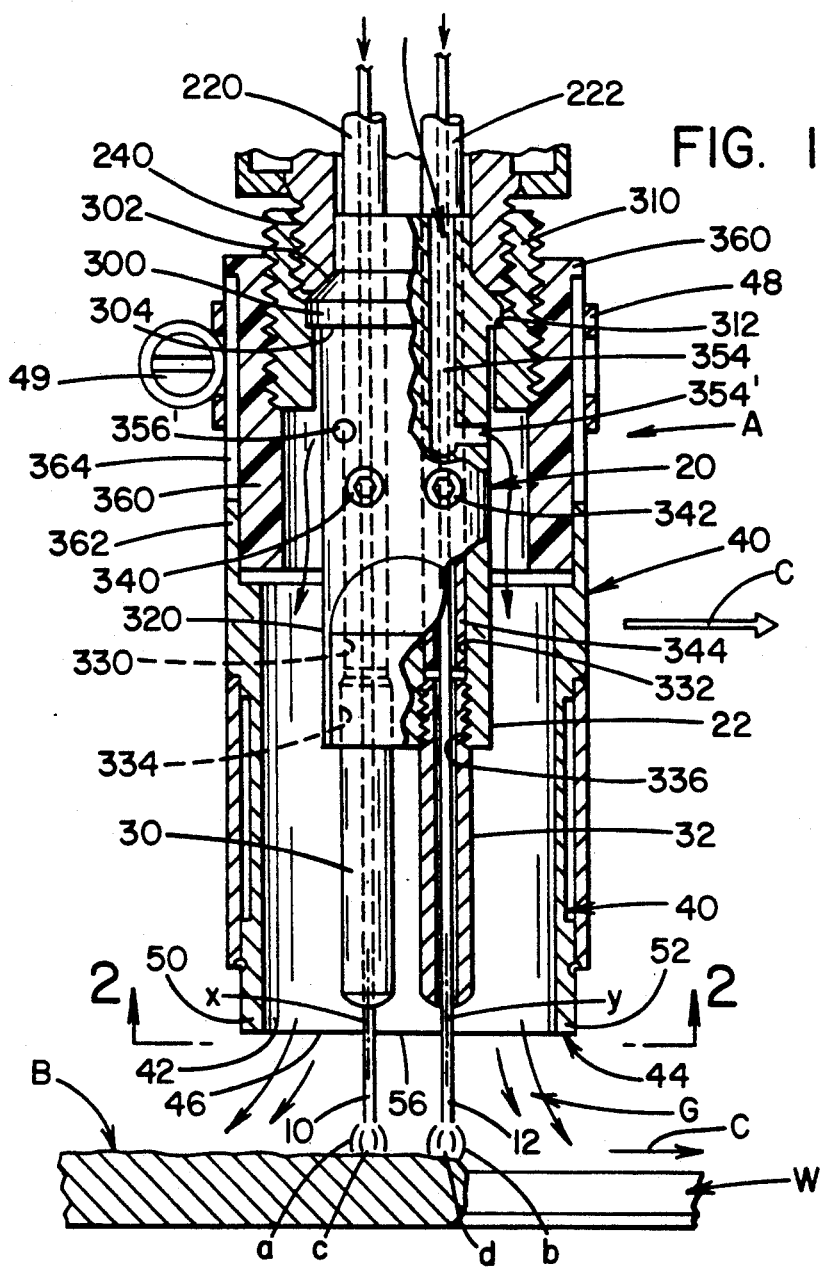
FIG. 1 is a partially cross sectioned side view illustrating the preferred embodiment of the present invention for welding a bead onto a workpiece.
Figure 2:
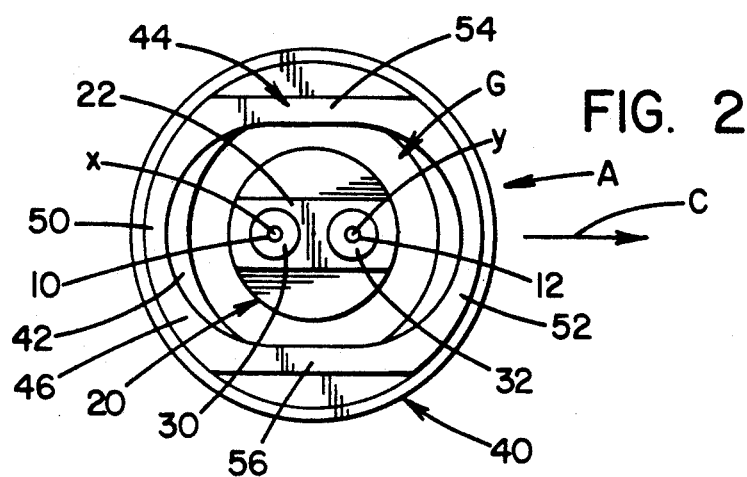
FIG. 2 is a view looking upwardly along line 2—2 of FIG. 1.
Figure 8:
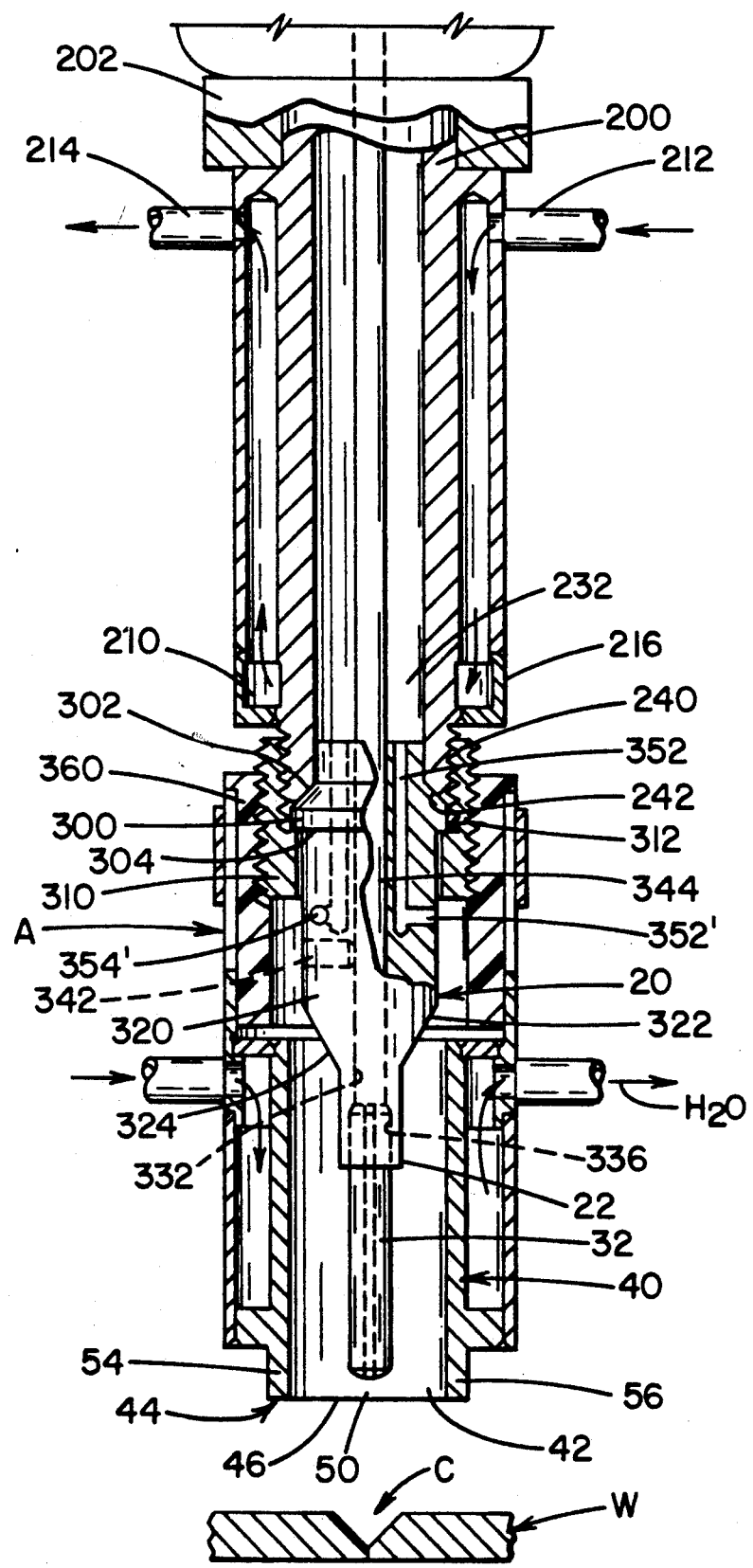
FIG. 8 is a side elevational view of the preferred embodiment of the present invention taken generally along line 8—8 of FIG. 7.

Referring now to the drawings wherein the showings are for the purpose of illustrating preferred embodiments of the invention only and not for the purpose of limiting same, FIGS. 1 and 2 illustrate a MIG (GMAW) welding torch A adapted to deposit a weld bead of steel B on a workpiece W along a pass line C which may be the fillet between two plates, a groove between abutting beveled plates as illustrated in FIG. 3 or any other appropriate workpiece welding operation. Welding wires 10, 12, which may be flux cored wires or solid welding wires, have relatively small diameters and are passed in a parallel fashion through welding wire guide member 20 having a wire exit end 22 facing downwardly toward workpiece W. Elongated tubular tips 30, 32 are threadably received in welding wire guide member 20 at end 22 to allow feeding of parallel wires or electrodes 10, 12 along centerlines x, y associated with threadably connected wire guide tips 30, 32, respectively. Torch A includes a novel nozzle in the form of a shield gas shroud 40 extending along elongated, electrically conductive wire guide member 20 and defining an oblong gas opening 42 having a relatively thin peripheral rim 44 defining spaced curved ends 50, 52 connected by parallel straight side walls 54, 56. Shroud 40 defines and constricts the flow of gas G in an envelope around wires 10, 12. Gas G is in the form of a shielding gas such as carbon dioxide, argon or mixtures thereof. By passing a substantial amount of gas downwardly through shroud 40 against workpiece W and spacing the end 46 of the shroud approximately ⅜ inch away from workpiece W, the gas forms a shielding function for the MIG welding process and also maintains the molten condition of the weld bead B between electrodes 10, 12 as the electrodes are melted by arc a, b between the electrode and workpiece W. Wires 10, 12 intersect the workpiece at spaced points c, d as best shown in FIG. 3 and FIG. 4. Shroud 40 is adjustable on torch A by a standard hose clamp 48 with adjusting screw 49. Details of the torch will be explained in connection with the practical embodiment of the invention shown in FIGS. 7 and 8.

Referring now to FIGS. 3 and 4, a puddle or pool of molten metal 100 is oblong in shape and defined by the spacing between points c, d which are the intersection points of centerlines x, y with workpiece W. Puddle or pool 100 has an intermediate area 102 and two generally curved end portions 104, 106. The length of the intermediate area 102 is determined by the spacing between intersection points c, d. In accordance with the invention this spacing is in the range of about 3/16 inch to about ⅜ inch. By using this small dimension for the spacing and using welding wire of the smaller type, such as 0.045 or 0.052 for solid wire and 0.052 or 1/16 inch for flux cored wire, it has been found surprising that a continuous molten puddle or pool 100 can be maintained. The invention relates to the use of the small wire with a small or close dimension between points c and d to maintain the molten metal pool especially in intermediate area or portion 102. In prior methods, the spacing was large because of the demands of the process; but, the metal could be kept molten by either flux from the electrodes or flux from a dispenser, in subarc welding.

Arcs a, b cause heat to melt the end of wires 10, 12, respectively, while the wires are fed through wire guide member 20. The molten metal formed by melting of the electrodes or wires is deposited as bead B on workpiece W. This workpiece is illustrated as plates 110, 112 with an intermediate beveled portion 114. The molten metal from the electrodes forms the oblong puddle or pool 100 of bead B, which puddle continues to move relative to workpiece W for melting and filling bevel portion 114 between plates 110, 112. In the preferred embodiment, the electrodes 10, 12 are aligned in the direction of relative movement between the workpiece and torch A. This is illustrated as direction r in FIG. 4. Of course, to produce a wider bead B, it is possible to move welding torch A in the direction with the wires 10, 12 oriented in the direction s shown in FIG. 4. FIG. 4 illustrates that the puddle 100 can move laterally or longitudinally with respect to the spacing between wires 10, 12, or directions between these extremes. As molten puddle 100 is deposited as bead B, the close spacing of wires 10, 12 maintains intermediate portion 102 in a molten condition as illustrated in FIG. 3B. After the electrodes have deposited the molten metal and have moved along the pass line C, the trailing portion of weld bead B is solidified as schematically illustrated in FIG. 3C. Molten metal puddle 100 is elongated; however, it is not stepped with more metal having been deposited at point c on top of metal being deposited on point d. To the contrary, the puddle is a unitary molten metal mass fed jointly by electrodes 10, 12, as these electrodes are being melted by arcs a, b. This molten metal pool is moved along the pass line to solidify into bead B. In accordance with the present invention, the spacing and diameter of the wires 10, 12 allows two arcs a, b to be formed between the electrodes. Both arcs are electrically connected to guide member 20 so that electric current is passing through both of the two electrodes 10, 12 to melt the electrodes as they approach their respective arcs a, b. Thus, a single power supply produces a potential between workpiece W and guide member 20, which potential causes current flow through wires 10, 12 with a high enough potential and energy level to maintain separate arcs a, b. Of course these arcs may merge as the two wires become closer in spacing, which is especially true when solid welding wire is employed for electrodes 10, 12, as will be discussed in connection with the schematic illustrations in FIG. 6.

The embodiment of the invention shown in FIG. 5 is primarily for employing flux cored electrodes. In this embodiment, wires or electrodes 10, 12 are flux cored and the centerlines x, y are spaced from each other approximately ⅜ inch. Stick out of wires 10, 12 is ⅝ inch plus or minus ⅛ inch. This stick out is approximately ⅛ inch more than the spacing between end 46 of shroud 40 and workpiece W. Thus, tips 30, 32, which are threadably received in end 22 of guide member 20, terminate at a position recessed approximately ⅛ within shroud 40. In practice, length L of contact tips 30, 32 is approximately 1-1/6 inch. The spacing between centerlines x, y is in the range of about ¼ inch–⅜ inch. The larger spacing is employed when flux cored wire is used as electrodes 10, 12 as shown in FIG. 5. In this embodiment, the metal is more fluid and the arc can burn through the upper flux or puddle 100 into the molten metal of the puddle. Two separate and distinct arcs a, b are generally maintained in this particular embodiment. In practice, and in accordance with another aspect of the invention, when metal wire electrodes 10', 12' are employed as shown in FIG. 6, one tip, i.e. tip 32', of the threadably received contact tips 30', 32' are slightly angled with respect to the other; therefore, the points c, d at the intersection of the workpiece or puddle with the extended axes x', y' is less than the spacing shown in FIG. 5. The same basic spacing of the wires within member 20 occurs; however, the tip 32' is placed into the end 22' of member 20' at an angle in the range of 0°–10°. Preferably this angle is 5°. By angling tip 32' the spacing between points c, d can be reduced. In practice, this reduction is from ⅜ inch to approximately 3/16 inch. The stick out for wire 10', 12' is the same in both embodiments of FIG. 5 and FIG. 6. These two embodiments operate in accordance with the discussion in the introductory portion, as well as the discussion with respect to FIGS. 1–4. When the spacing is reduced, such as illustrated in the embodiment of FIG. 6, the two arcs a', b' may merge together on the upper portion of puddle 100'. This embodiment still essentially has two separate arcs a', b' since current flow is maintained through both wires 10', 12' for melting the end of these wires through the heat of the arc.

Referring now to FIGS. 7–11 and also FIGS. 1 and 2 the practical embodiment of the present invention is illustrated. Welding torch A is supported or mounted on base 200 which is electrically conductive and coupled with bus bar 202. An annular water chamber 210 includes a water inlet 212 and water outlet 214 and is capped at the lower end by ring 216. Thus, water cooling of electrode or base 200 is accomplished by circulation of a cooling liquid in chamber 210 by way of inlet 212 and outlet 214. Wire passages 220, 222 extend in a parallel fashion through base 200. An appropriate wire feeding mechanism feed wires 10, 12 through passages 220, 222, respectively, in accordance with standard technology for GMAW welding. Inert gas, such as carbon dioxide, argon and mixtures thereof is directed to base 200 through inlet 230 into an internal central passage 232, in which the wire passages 220, 222 are formed. Outward end 240 of base 200 is threaded and includes a conical contact surface 242 adapted to electrically contact and releasably secure wire guide member 20 constructed in accordance with the present invention. This wire guide member includes an upper mounting means in the form of shoulder 300 having a beveled surface 302 matching conical surface 242 of conductive base 200. A forward facing collar 304 is contacted by an annular connector ring 310 having a shoulder 312 adapted to coact with collar 304 to lock or mount wire guide member 20 with respect to conductive base 200. Wire guide member 20 also includes a cylindrical body 320 having outwardly or downwardly relieved side portions 322, 324 forming a tongue onto which are mounted downwardly extending contact tips 30, 32. Parallel wire bores 330, 332 extend axially through cylindrical body 320 and terminate in lower threaded portions 334, 336 which threadably receive tips 30, 32, respectively. This embodiment of the invention is for the flux cored wires; therefore, the threaded bores 334, 336 are parallel. Lock bolts 340, 342 in the side of body 320 are employed for the purpose of holding a wire guide sleeve 344 within parallel wire bores 330, 332. These guide sleeves extend from the top of mounting base 200 through wire passages 220, 224 and into wire bores 330, 332. To direct the gas through oblong opening 42 there are provided four separate, axially extending gas passages 350, 352, 354, and 356 from the upper end of member 20 downwardly to approximately to mid point of cylindrical body 320. At that location, gas outlets 350', 352', 354' and 356' intersect the gas passages so that gas from inlet 230 and gas passage 232 is directed at high velocity through passages 350, 352, 354 and 356 and radially outwardly through outlets 350' 352', 354' and 356'. In operation, wires 10, 12 are fed through base 200 and guide member 20 to workpiece W where electrical current from base 200 is allowed to flow through the wires creating arcs a, b for the purposes previously described. Shielding gas from outlets 350', 352', 354' and 356' flow around tips 30, 32 and wires 10, 12 to shield molten puddle or pool 100 by an oblong envelope of shielding gas. Insulator sleeve 360 is threaded onto annular connector ring 310 to isolate shroud 40 electrically from base 200. The upper end of shroud 40 has a thin tubular portion 362 with a number of circumferentially spaced slots 364. In this manner, the shroud can be adjusted by use of hose clamp 48, best shown in FIG. 1.

Figure 10:
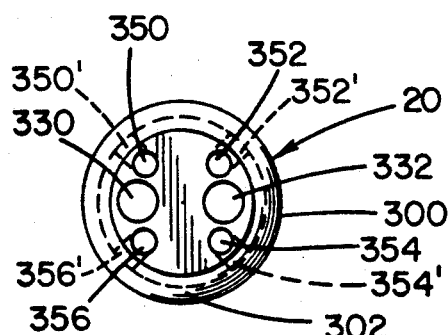
FIG. 10 is an end view of the wire guide member taken generally along line 10—10 of FIG. 9.
Figure 11:
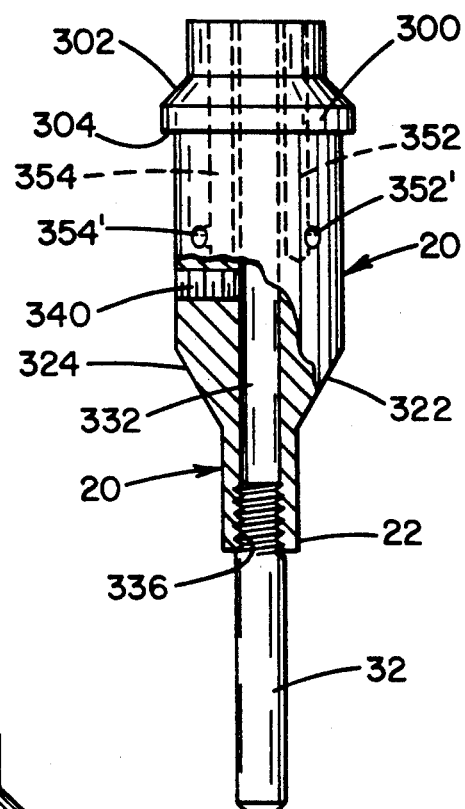
FIG. 11 is a side elevational view of the embodiment of the invention illustrated in FIG. 9; and, FIG. 12 is a plan view of a modification of the wire guide member shown in FIG. 9, which modification is to be used with parallel solid welding wire.
Figure 9:
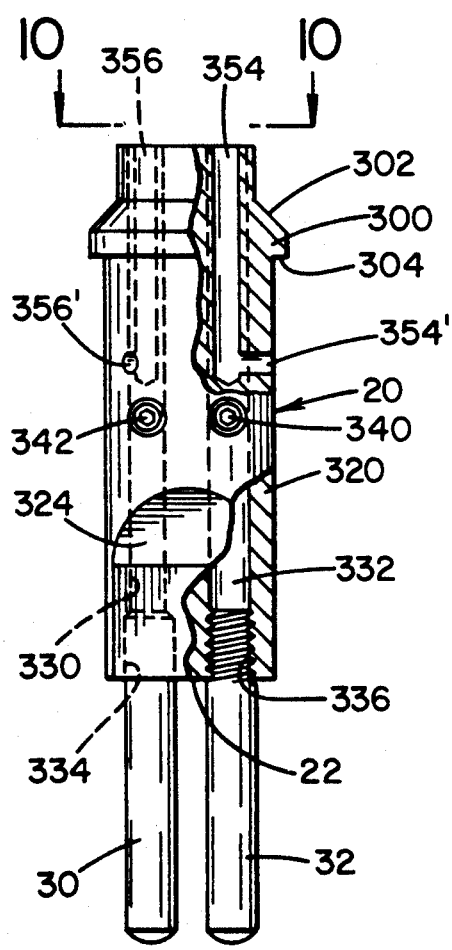
FIG. 9 is a plan view of the wire guide member for use with parallel flux cored wires.
Figure 12:
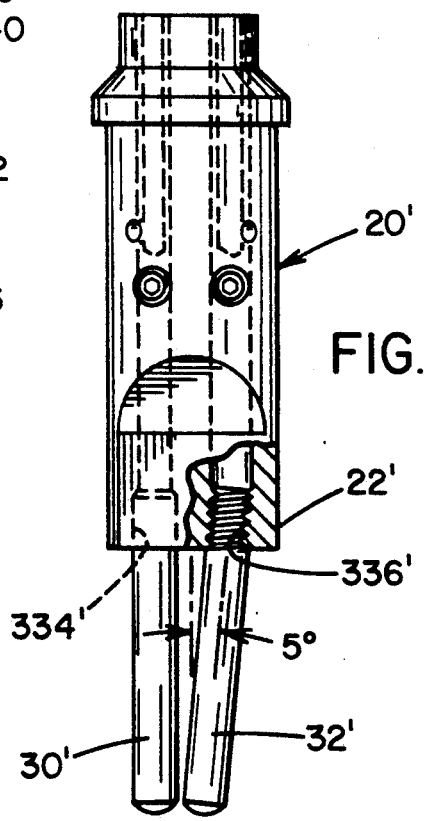

Referring now to FIG. 12, the wire guide member 20' is essentially the same as the wire guide member 20 shown in FIGS. 9-11 and is the same as schematically illustrated in FIG. 6. In this embodiment of the invention, threaded bore 336' is at an angle of approximately 5° with respect to threaded bore 334'. This particular modification is specifically employed for using solid welding wire as explained in connection with the embodiment of the invention shown in FIG. 6.

In accordance with the invention, the parallel wires 10, 12 are small in diameter, i.e. in the general range of 0.30 to 5/64, with the size of solid wires being in the general range of 0.030 to 1/16 and the size of flux cored wires being in the general range of 0.035 to 5/64 inch.

Having thus defined the invention, the following is claimed:

1. A method of welding along a pass line on a steel workpiece, said method comprising the steps of:

(a) providing first and second consumable steel welding wires both connected to a single power source, each having a diameter equal to or less than about 5/64 inch hand each having an axially extending centerline;

(b) simultaneously feeding said welding wires with said centerlines in generally parallel relationship toward said workpiece with the extended centerlines of said welding wires generally intersecting said workpiece at individual points spaced from each other a distance in the range about 3/16 to about ⅜ inch;

(c) creating a separate arc between each of said wires and said workpiece;

(d) passing a single protective envelope of shielding gas axially along said first and second welding wires simultaneously and around said two separate arcs extending between said consumable welding wires and said workpiece; and, (e) causing relative movement between said two gas shielded welding wires and said workpiece in a direction corresponding to said pass line on said workpiece.

2. A method as defined in claim 1 wherein said welding wires are flux core wires having a diameter in the range of about 5/64 to 0.035 inches and said points are spaced apart about ¼-⅜ inch.

3. A method as defined in claim 2 wherein said welding wire has a diameter of 1/16 inch and said points are spaced about ¼-⅜ inch.

4. A method as defined in claim 3 wherein said points are spaced about ⅜ inch.

5. A method as defined in claim 2 wherein said welding wire has a diameter of 0.052 inches and said points are spaced about ¼-⅜ inch.

6. A method as defined in claim 5 wherein said points are spaced about ⅜ inch.

7. A method as defined in claim 2 wherein said points are spaced apart about ⅜ inch.

8. A method as defined in claim 1 wherein said welding wires are solid steel welding wires with a diameter in the range about 0.030-1/16 inches.

9. A method as defined in claim 8 wherein said points are spaced apart about 3/16 to ¼ inch.

10. A method as defined in claim 8 wherein said points are spaced apart about 3/16 inch.

11. A method as defined in claim 10 wherein said centerlines of said wires, as they extend toward said workpiece, have an included angle of less than 10°.

12. A method as defined in claim 11 wherein said angle is about 5°.

13. A method as defined in claim 8 wherein said centerlines of said wires, as they extend toward said workpiece, have an included angle of less than 10°.

14. A method as defined in claim 13 wherein said angle is about 5°.

15. A method as defined in claim 1 wherein said centerlines of said wires, as they extend toward said workpiece, have an included angle of less than 10°.

16. A method as defined in claim 15 wherein said angle is about 5°.

17. A method as defined in claim 1 wherein said points are spaced apart about 3/16 inch.

18. A method as defined in claim 1 wherein said points are spaced apart about ⅜ inch.

19. The method of claim 1 wherein said two separate arcs extending between said consumable wires and said workpiece continuously maintain a common molten metal weld puddle.

20. An electric arc welding apparatus using consumable steel welding wire having a diameter equal to or less than about 5/64 inch and comprising: an interchangable, elongated, electrically conductive welding wire guide member having a generally cylindrical body with an upper end with means for mounting said guide member and a lower wire exit end, said guide member including first and second welding wire having a diameter equal to or less than about 5/64 inch, said member having a generally cylindrical body with an upper end with means for mounting said guide member and a lower wire exit end, said guide member including first and second parallel welding wire passages spaced from each other a selected centerline distance in a given direction and extending from said upper end to said exit end, said selected centerline distance in the range about ¼ inch to about ⅜ inch, means for threadably receiving a first tubular welding wire tip intersecting said first welding wire passage, means for threadably receiving a second tubular welding wire tip intersecting said second welding wire passage whereby first and second welding wires can be simultaneously fed through said parallel passages and through first and second tubular welding wire tips to be mounted on said guide member, and passage means in said welding wire guide member for directing a shielding gas generally outwardly from said cylindrical body.

21. An apparatus as defined in claim 20 wherein said gas passage is generally oblong in cross section with the larger dimension of said cross section being in the given direction of the spacing between said first and second welding wire passages in said guide member.

22. An apparatus as defined in claim 21 including means for mounting said tubular tips into said guide member at an angle.

23. An apparatus as defined in claim 21 wherein said tubular tips each include a central opening with a diameter in the general range of 5/64 to 0.030 inches.

24. An apparatus as defined in claim 20 including means for mounting said tubular tips into said guide member at an angle relative to said centerlines of said first and second welding wire passages, whereby said tubular tips converge.

25. An apparatus as defined in claim 24 wherein said angle is less than about 10°.

26. An apparatus as defined in claim 24 wherein said angle is about 5°.

27. An interchangeable, elongated electrically conductive welding wire guide member for use in an electric arc welding apparatus using consumable steel welding wire having a diameter equal to or less than about 5/64 inch, said member having a generally cylindrical body with an upper end with means for mounting said guide member and a lower wire exit end, said guide member including first and second parallel welding wire passages spaced from each other a selected centerline distance in a given direction and extending from said upper end to said exit end, said selected centerline distance in the range about ¼ inch to about ⅜ inch, means for threadably receiving a first tubular welding wire tip intersecting said first welding wire passage, means for threadably receiving a second tubular welding wire tip intersecting said second welding wire passage whereby first and second welding wires can be simultaneously fed through said parallel passages and through first and second tubular welding wire tips to be mounted on said guide member, and passage means in said welding wire guide member for directing a shielding gas generally outwardly from said cylindrical body.

28. A welding wire guide member as defined in claim 27 including means for mounting said tubular tips into said guide member at an angle relative to said centerlines of said first and second welding wire passages, whereby said tubular tips converge.

29. A welding wire guide member as defined in claim 28 wherein said angle is less than about 10°.

30. A welding wire guide member as defined in claim 28 wherein said angle is about 5°.

31. The apparatus of claim 27, wherein said tubular tips each include a central opening with a diameter in the general range of 5/64 inch to 0.030 inches.

32. An electric arc welding apparatus for welding of steel using consumable steel welding wire having a diameter less than or equal to about 5/64 inch and comprising: an interchangeable, elongated, electrically conductive welding wire guide member having a generally cylindrical body with an upper end with means for mounting said guide member and a lower wire exit end, said guide member including first and second parallel welding wire passages spaced from each other a selected centerline distance in a given direction and extending from said upper end to said exit end, said selected centerline distance int he range about ¼ inch to about ⅜ inch, means for threadably receiving a first tubular welding wire tip intersecting said first welding wire passage, and means for threadably receiving a second tubular welding wire tip intersecting said second welding wire passage whereby first and second welding wires can be simultaneously fed through said parallel passages and through said first and second tubular welding wire tips; and, a tubular shroud around said cylindrical body of said welding wire guide member to define a downwardly directed gas passage around both said first and second welding wire tips.

33. An apparatus as defined in claim 32 wherein said gas passage is generally oblong in cross section with the larger dimension of said cross section being in the given direction of the spacing between said first and second welding wire passages in said guide member.

34. An apparatus as defined in claim 33 including means for mounting said tubular tips into said guide member at an angle.

35. An apparatus as defined in claim 32 including means for mounting said tubular tips into said guide member at an angle relative to said centerlines of said first and second welding wires passages, whereby said tubular tips converge.

36. An apparatus as defined in claim 35 wherein said angle is less than about 10°.

37. An apparatus as defined in claim 35 wherein said angle is about 5°.

* * * * *